United States Patent
Bukowski (10) Patent No.: US 11,799,260 B2
(45) Date of Patent: Oct. 24, 2023

(54) SYSTEM AND METHOD FOR ZEROTH-ORDER DIAGNOSTIC IN SPECTRAL BEAM COMBINING SYSTEM

(71) Applicant: Raytheon Company, Waltham, MA (US)

(72) Inventor: Leva E. Bukowski, Plano, TX (US)

(73) Assignee: Raytheon Company, Waltham, MA (US)

( * ) Notice: Subject to any disclaimer, the term of this patent is extended or adjusted under 35 U.S.C. 154(b) by 203 days.

(21) Appl. No.: 17/066,320

(22) Filed: Oct. 8, 2020

(65) Prior Publication Data
US 2022/0115829 A1  Apr. 14, 2022

(51) Int. Cl.
| | |
|---|---|
| H01S 3/00 | (2006.01) |
| G01J 1/42 | (2006.01) |
| G02B 17/02 | (2006.01) |
| G02B 27/30 | (2006.01) |
| G02B 27/42 | (2006.01) |
| H01S 3/23 | (2006.01) |
| H01S 3/067 | (2006.01) |

(52) U.S. Cl.
CPC .......... *H01S 3/0014* (2013.01); *G01J 1/4257* (2013.01); *G02B 17/023* (2013.01); *G02B 27/30* (2013.01); *G02B 27/4233* (2013.01); *H01S 3/2383* (2013.01); *H01S 3/067* (2013.01)

(58) Field of Classification Search
CPC ...... H01S 3/0014; H01S 3/2383; H01S 3/067; G01J 1/4257; G02B 17/023; G02B 27/30; G02B 27/4233
See application file for complete search history.

(56) References Cited

U.S. PATENT DOCUMENTS

| | | | |
|---|---|---|---|
| 7,199,924 B1 * | 4/2007 | Brown | H01S 3/2383 398/87 |
| 7,233,442 B1 | 6/2007 | Brown et al. | |
| 9,329,388 B1 * | 5/2016 | Amirparviz | G02B 5/1842 |
| 2016/0109290 A1 | 4/2016 | Klennert | |

(Continued)

FOREIGN PATENT DOCUMENTS

| | | |
|---|---|---|
| EP | 1870028 A1 | 12/2007 |
| KR | 101611347 B1 | 4/2016 |
| NO | 2011130131 A1 | 10/2011 |

OTHER PUBLICATIONS

International Search Report and Written Opinion of the International Searching Authority dated Dec. 1, 2021 in connection with International Patent Application No. PCT/US2021/050920, 10 pages.

(Continued)

*Primary Examiner* — Georgia Y Epps
*Assistant Examiner* — Don J Williams (57) ABSTRACT

An apparatus includes a diffractive grating configured to receive multiple output beams from an array of laser sources. The apparatus also includes one or more optical elements configured to receive, direct, and focus multiple zeroth-order light beams, where the zeroth-order light beams include portions of the output beams reflected off the diffractive grating. The apparatus further includes a detector configured to receive the zeroth-order light beams from at least one of the one or more optical elements and process the zeroth-order light beams to generate diagnostic information.

20 Claims, 5 Drawing Sheets

(56) References Cited

U.S. PATENT DOCUMENTS

2019/0140419 A1* 5/2019 Wong .................. G02B 27/0944
2021/0151948 A1* 5/2021 Paul ................... G02B 27/1086

OTHER PUBLICATIONS

James E. Harvey, et al., "Hole Grating Beam Sampler - A Versatile High Energy Laser (HEL) Diagnostic Tool" Proceedings of SPIE 0240, Periodic Structures, Gratings, Moire Patterns, and Diffraction Phenomena 1,24th Annual Technical Symposium, 1980, San Diego, California, United States, 12 pgs.

* cited by examiner

FIG. 3A NOMINAL PIB IMAGE

FIG. 3B MIS-ALIGNED FIBER (POINTING OR POSITION)

FIG. 3C WAVELENGTH DE-TUNINGS

SYSTEM AND METHOD FOR ZEROTH-ORDER DIAGNOSTIC IN SPECTRAL BEAM COMBINING SYSTEM

GOVERNMENT RIGHTS

This invention was made with U.S. Government support under contract number KSC-19-011 (prime contract number DOTC-17-01-INIT0276) awarded by the U.S. Navy. The U.S. Government may have certain rights in this invention.

TECHNICAL FIELD

This disclosure is generally directed to laser systems. More specifically, this disclosure is directed to a system and method for zeroth-order diagnostic in a spectral beam combining system.

BACKGROUND

Spectral beam combining (SBC) is a well-established approach to power-scaling of fiber laser sources. In particular, spectral beam combining is common in high energy laser (HEL) applications. A frequently-adopted embodiment of spectral beam combining includes wavelength-multiplexing an array of fiber laser sources, where each laser source is set to operate at a specific wavelength. The multiplexer can be a dispersive optical element, such as a diffractive grating. Prior approaches for monitoring combined beam quality in SBC systems typically involve turning different individual source beams on and off in sequence to determine a problem. However, these approaches can be time consuming to perform.

SUMMARY

This disclosure relates to a system and method for zeroth-order diagnostic in a spectral beam combining system.

In a first embodiment, an apparatus includes a diffractive grating configured to receive multiple output beams from an array of laser sources. The apparatus also includes one or more optical elements configured to receive, direct, and focus multiple zeroth-order light beams, where the zeroth-order light beams include portions of the output beams reflected off the diffractive grating. The apparatus further includes a detector configured to receive the zeroth-order light beams from at least one of the one or more optical elements and process the zeroth-order light beams to generate diagnostic information.

In a second embodiment, a system includes a fiber launch array having multiple laser sources configured to generate multiple output beams. The system also includes a diffractive grating configured to receive the multiple output beams from the multiple laser sources. The system further includes one or more optical elements configured to receive, direct, and focus multiple zeroth-order light beams, where the zeroth-order light beams include portions of the output beams reflected off the diffractive grating. In addition, the system includes a detector configured to receive the zeroth-order light beams from at least one of the one or more optical elements and process the zeroth-order light beams to generate diagnostic information.

In a third embodiment, a method includes generating multiple output beams at a fiber launch array having multiple laser sources. The method also includes receiving the multiple output beams from the multiple laser sources at a diffractive grating. The method further includes receiving, directing, and focusing multiple zeroth-order light beams using one or more optical elements, where the zeroth-order light beams include portions of the output beams reflected off the diffractive grating. In addition, the method includes receiving the zeroth-order light beams from at least one of the one or more optical elements at a detector and processing the zeroth-order light beams to generate diagnostic information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity, and is not meant to imply that the feature or component cannot be employed in the embodiments described in connection with that figure.

As noted above, spectral beam combining (SBC) is a well-established approach to power-scaling of fiber laser sources. A common SBC guideline is to maximize available power from individual component laser sources so as to reduce the required source count and the overall system complexity towards a target power goal. Inherent in the goal of maximizing power is maintaining a high beam quality in the overall combined beam. However, misalignments in one or more of the fiber laser sources can result in reduced beam quality. Prior approaches for monitoring combined beam quality in SBC systems typically involve turning different individual source beams on and off in sequence to determine a problem. For example, some systems use an entire power-in-a-bucket (PIB) assembly folded into a packaged system. In these systems, the combined beam is sampled, and laser sources are iteratively turned on and off to check alignment. However, these approaches can be time consuming to perform.

To address these or other issues, this disclosure provides various systems and methods that facilitate diagnostics of combined beam quality in an SBC system. The disclosed embodiments use zeroth-order light, which is otherwise discarded in an HEL SBC system, to monitor the combined beam quality and the individual fibers simultaneously in real-time with a single detector. As described in greater detail below, the disclosed embodiments use the zeroth-order light reflected off a beam combining grating to image the sources in a fiber launcher array. This enables a diagnostic system to monitor relative fiber powers between fiber sources, monitor individual fiber alignment, monitor for catastrophic damage to the fibers, and estimate combined beam quality in real-time by monitoring for changes in nominal alignment of the fiber sources. In some embodiments, the diagnostic system can be fit into a lens tube not much larger than a soda can, resulting in a drastically reduced packaging space compared to traditional PIB assemblies. Embodiments of this disclosure may be used in a variety of applications, such as in HEL systems, although the disclosed embodiments are not limited to any particular type of application.

Figure 1:
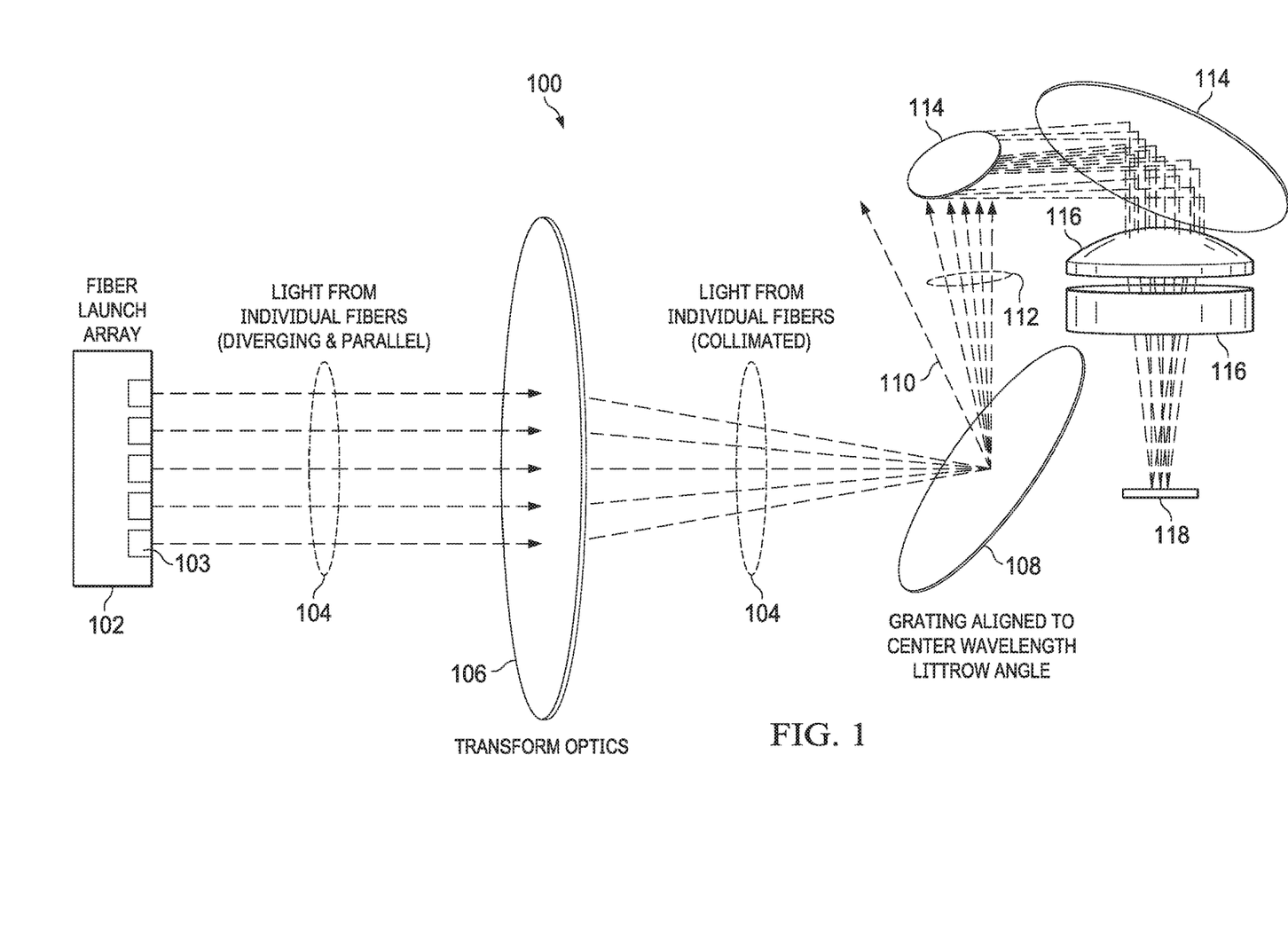
FIGS. 1 and 2 illustrate an example spectral beam combining (SBC) system in which diagnostics can be performed using zeroth-order light according to this disclosure.
Figure 2:
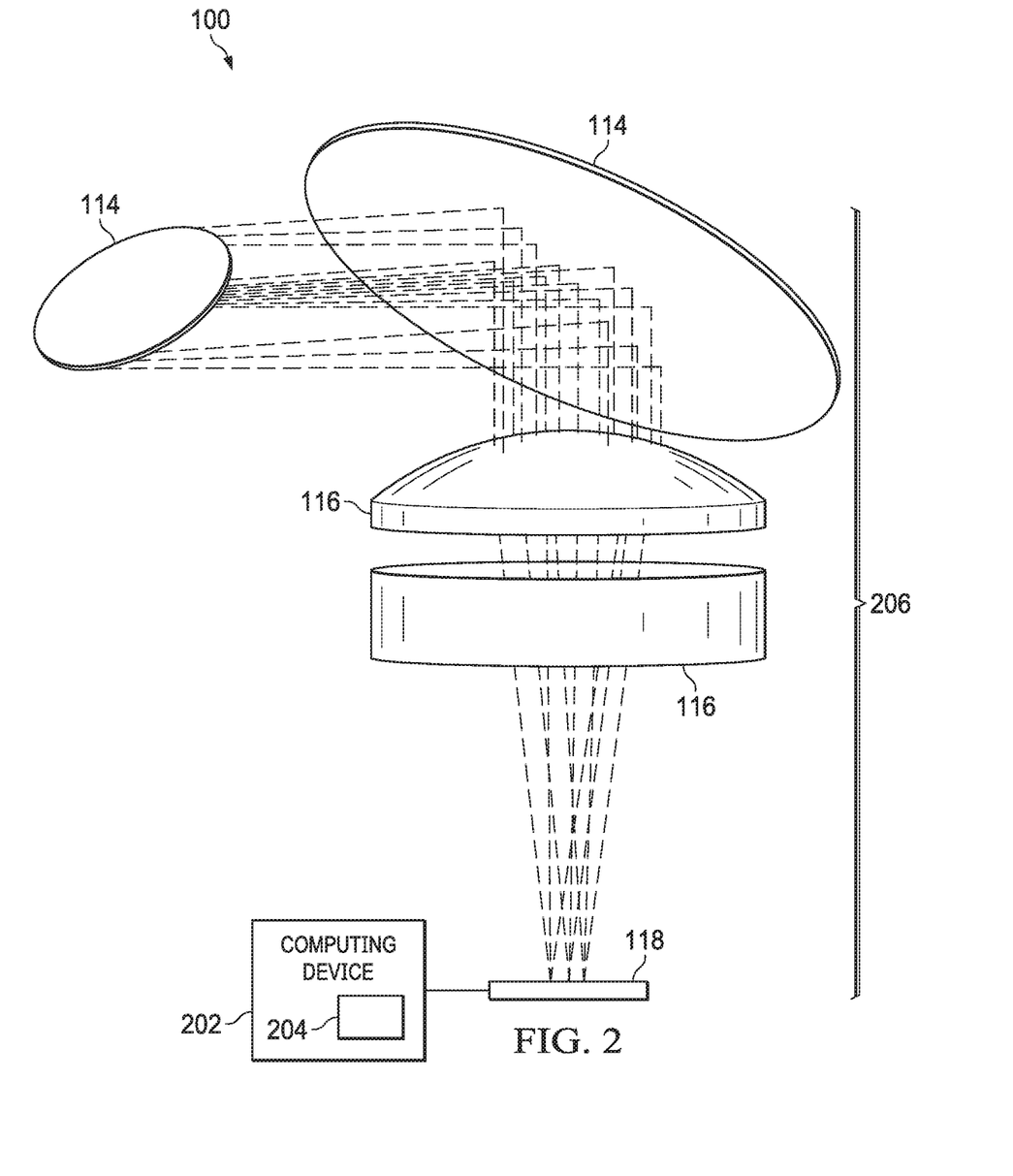

FIGS. 1 and 2 illustrate an example SBC system 100 in which diagnostics can be performed using zeroth-order light according to this disclosure. In particular, FIG. 1 shows the system 100, and FIG. 2 shows some components of the system 100 in greater detail.

As shown in FIG. 1, the system 100 includes a fiber launch array 102, which includes an array of fiber laser sources 103. Each fiber laser source 103 is configured to generate a laser light beam, and different fiber laser sources 103 may be configured to generate laser light beams at different wavelengths. Each fiber laser source 103 represents any suitable structure configured to generate a laser light beam, such as a waveform generator, oscillator, filter, amplifier, phase modulator, controller, or the like. Each fiber laser source 103 may include or be coupled to an output delivery fiber. The distal ends of multiple output delivery fibers may be arranged in a linear or other array, which is often referred to as a "launch" array. The fiber launch array 102 generates multiple output beams 104, such as one beam from each fiber laser source 103. In some embodiments, the output beams 104 are arranged linearly such that the output beams 104 are substantially parallel and co-planar. Also, in some embodiments, an exit aperture of at least one laser source 103 may not be collocated with a rotational axis of the launcher, which can lead to misalignment issues that may be revealed using the diagnostic techniques described below.

The parallel output beams 104 from the fiber launch array 102 impinge upon one or more refractive or reflective transform optics 106, which cause the output beams 104 to be directed onto a diffractive grating 108 in a spatially-overlapping manner. In some embodiments, the transform optics 106 can include one or more collimators that collimate the output beams 104 and direct the collimated output beams 104 toward the diffractive grating 108 at one or more specific angles. In particular embodiments, the transform optics 106 can include an off-axis parabolic lens (a lens that is not rotationally symmetric). Because of this, a position change of a fiber laser source 103 in the fiber launch array 102 can result in a pointing error of an output beam 104 on the diffractive grating 108 after the output beam 104 passes through the transform optics 106. Similarly, a pointing angle error at a fiber laser source 103 in the fiber launch array 102 can result in a pointing error and a positional error of an output beam 104 on the diffractive grating 108 after the output beam 104 passes through the transform optics 106. These alignment errors can be revealed using the diagnostic techniques described below.

The output beams 104 are received at the diffractive grating 108, and the diffractive grating 108 produces a combined beam 110 using the output beams 104. In the combined beam 110, all of the individual component output beams 104 propagate together. In some embodiments, the diffractive grating 108 is aligned to the center wavelength Littrow angle. At this angle, the center wavelength of the combined beam 110 diffracts back on itself. In particular embodiments, the diffractive grating 108 is aligned to the center wavelength Littrow angle, rotated about a ruling axis of the diffractive grating 108 (the direction associated with the rulings or grooves in the diffractive grating 108), and tilted about its orthogonal axis. This directs the combined beam 110 along a compound incident angle.

In addition to the combined beam 110, multiple zeroth-order beams 112 are also produced using the diffractive grating 108. Incoming light to a grating generally diffracts off the grating at a specific angle depending on the order of diffraction, but a portion of the light does not diffract and instead reflects. This is referred to as zeroth-order light. In the system 100, the zeroth-order beams 112 are separate, undiffracted light beams that are not part of the combined beam 110. Thus, the zeroth-order beams 112 reflect off the diffractive grating 108 as though the diffractive grating 108 is a mirror. Typically, zeroth-order light is considered waste and is transmitted to a beam dump or otherwise absorbed. However, in the system 100, the zeroth-order beams 112 are used as a diagnostic tool.

Each of the zeroth-order beams 112 reflected off the diffractive grating 108 corresponds to one of the output beams 104 from the fiber launch array 102. One or more fold mirrors 114 or other optics receive the zeroth-order beams 112 from the diffractive grating 108 and direct the zeroth-order beams 112 to one or more optical elements 116. The one or more optical elements 116 focus the zeroth-order beams 112 onto a detector 118. Each fold mirror 114 includes any suitable structure configured to direct one or more light beams, and each optical element 116 includes any suitable structure configured to focus one or more light beams. While FIG. 1 depicts two fold mirrors 114 and two optical elements 116, any suitable number of fold mirrors 114 and any suitable number of optical elements 116 may be used in the system 100.

The detector 118 receives the zeroth-order beams 112 and processes the zeroth-order beams 112 in order to generate diagnostic information, such as one or more diagnostic images that can be displayed for review by an engineer or another user. Because there are multiple zeroth-order beams 112 received at the detector 118, the detector 118 can process each zeroth-order beam 112 and generate diagnostic information for each zeroth-order beam 112. The detector 118 includes any suitable structure configured to detect and process light beams. In some embodiments, the detector 118 includes one or more standard cameras, image sensors, or other imaging optics configured to receive and capture light in the visible spectrum or infrared spectrum. In particular embodiments, the detector 118 includes one or more thermal cameras or image sensors configured to detect thermal properties of the zeroth-order beams 112.

As shown in FIG. 2, the detector 118 can include or be communicatively coupled to a computing device 202. The computing device 202 is configured to process image data based on the zeroth-order beams 112 received at the detector 118 and generate diagnostic data, such as diagnostic image data. In some embodiments, the computing device 202 can include a display 204 that can present diagnostic images to a user.

In traditional systems, a combined beam is typically transmitted through a leaky mirror and a focusing element, which focuses any misaligned fiber outputs onto a detector. In order for the misalignment to be large enough to be detected by the detector, the linear distance between the focusing element and the detector is large, possibly up to one or two meters or more. Such a large size is impractical to implement in many assemblies with limited space.

Due to the optical properties of the zeroth-order beams 112, the diagnostic components of the system 100 (the fold mirrors 114, optical elements 116, and detector 118) may be able to fit into a very small space. For example, in some embodiments, the overall length of the diagnostic components (the distance between the fold mirrors 114 and the detector 118 as indicated by a dimension 206 in FIG. 2) is less than about six inches (about 15 centimeters). In particular embodiments, the overall length may be about 3.5 to 4.0 inches (about 9 to 10 centimeters). As a result, some embodiments can fit into a lens tube, which may be not much larger than a soda can. This is a drastically reduced packaging space compared to traditional PIB systems.

In some embodiments, one or more of the fold mirrors 114 or other components may include a protective window or uncoated optic. This may be useful in embodiments where it is not desired to have the full power of the undiffracted zeroth-order beams 112 coming into the optical elements 116 and the detector 118. This may be the case if the diffractive grating 108 is not particularly efficient, and the power of the zeroth-order beams 112 is high enough to potentially burn or otherwise damage the detector 118.

Although FIGS. 1 and 2 illustrate one example of an SBC system 100 in which diagnostics can be performed using zeroth-order light, various changes may be made to FIGS. 1 and 2. For example, various components may be added, omitted, combined, further subdivided, replicated, or rearranged according to particular needs. As a particular example, while the fiber launch array 102 is depicted as generating five output beams 104, other embodiments may include other numbers of output beams. In general, laser systems come in a wide variety of configurations, and FIGS. 1 and 2 do not limit this disclosure to any particular configuration of laser system. Also, while FIGS. 1 and 2 illustrate one example operational environment in which diagnostics can be performed using zeroth-order light, this functionality may be used in any other suitable system.

Figure 3A:
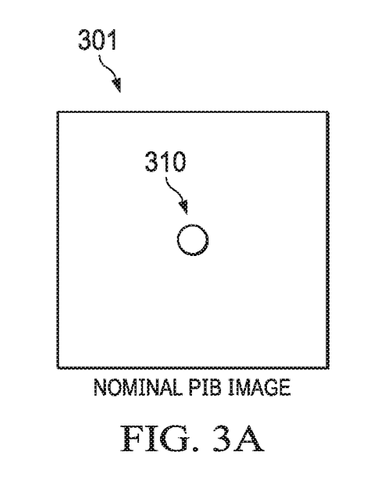
FIGS. 3A through 3F illustrate example benefits that can be realized using one or more of the embodiments of this disclosure.
Figure 3B:
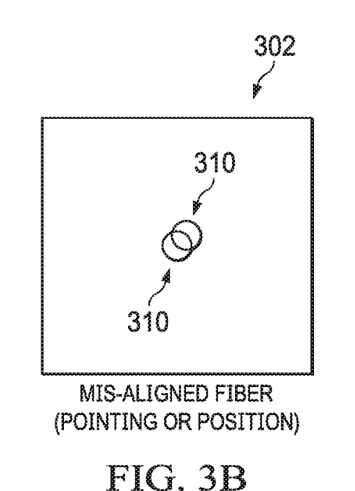
Figure 3C:
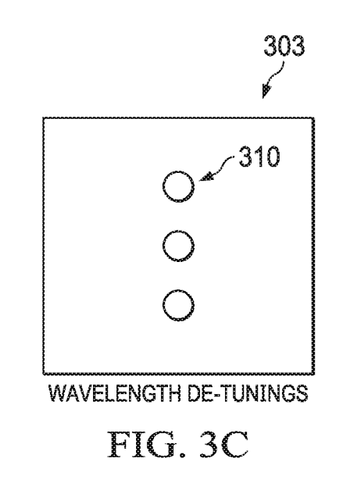
Figure 3D:
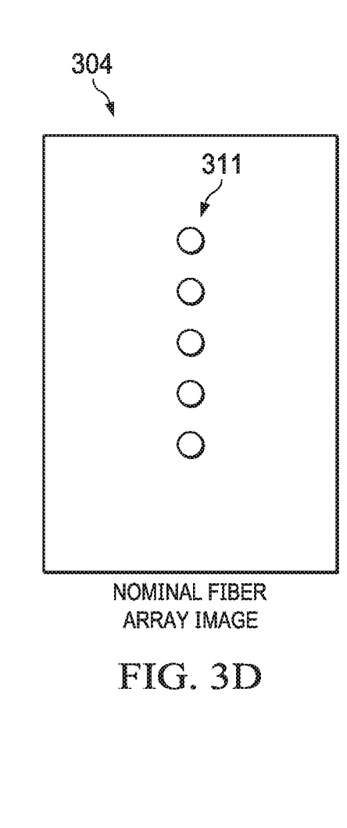
Figure 3E:
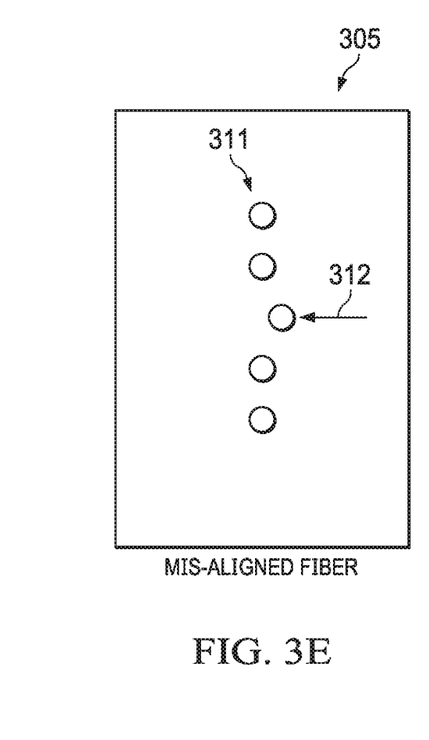
Figure 3F:
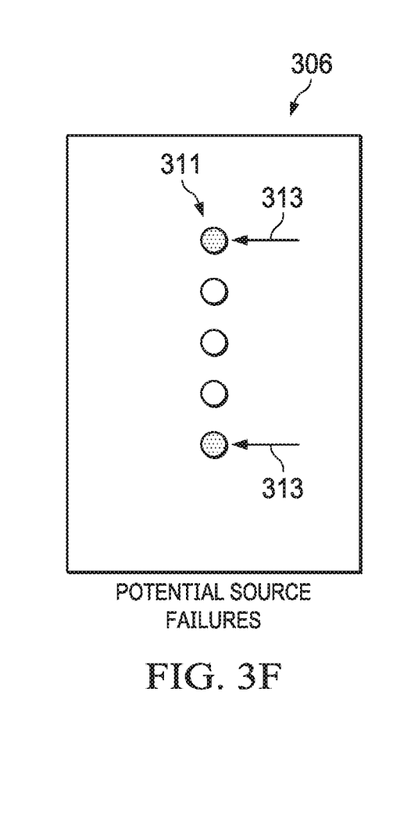

FIGS. 3A through 3F illustrate example benefits that can be realized using one or more of the embodiments of this disclosure. In particular, FIGS. 3A through 3C depict diagnostic images 301-303 of a laser array obtained using a conventional detector system, and FIGS. 3D through 3F depict diagnostic images 304-306 of a laser array obtained using the system 100.

The diagnostic images 301-303 shown in FIGS. 3A through 3C depict misalignment and beam combining errors that can be viewed in a conventional PIB diagnostic assembly. In FIG. 3A, the diagnostic image 301 is a nominal image in which the fibers of the launch array are properly aligned. Only one light point 310 is displayed for the combined beam, regardless of the number of fibers in the launch array. In FIG. 3B, the diagnostic image 302 shows multiple light points 310, which indicates a misalignment of one or more fibers in position, pointing angle, or both. However, the type of misalignment and the particular fiber involved is not readily determined from a review of the diagnostic image 302. In FIG. 3C, the diagnostic image 303 shows multiple light points 310 in a pattern that is associated with wavelength detuning.

In the PIB diagnostic assembly associated with FIGS. 3A through 3C, the misalignments in pointing, position, or wavelength are all coupled. Individual fiber monitoring is not possible without turning the individual fibers on and off. Thus, an engineer or other user cannot tell which fiber or fibers are causing a problem without disrupting operation. Also, monitoring the fibers individually often relies on internal software to the laser sources or additional optics, which may not be adequate for diagnostic activities.

In contrast, the diagnostic images 304-306 shown in FIGS. 3D through 3F depict improved diagnostic information for review by a user. The system 100 decouples wavelength detuning from position and pointing misalignment of the fiber laser sources 103. All of the individual fiber laser sources 103 are imaged together in an array so that a problem with one or more of the fiber laser sources 103 is immediately apparent. The diagnostic images 304-306 do not show diffracted light but instead depict mirror image light. Thus, the diagnostic images 304-306 are not dependent on the wavelengths of the fiber laser sources 103.

In FIG. 3D, the diagnostic image 304 is a nominal image in which the fiber laser sources 103 of the launch array 102 are properly aligned. The diagnostic image 304 shows multiple light points 311 in a line, where each light point 311 has a one-to-one correspondence with one of the fiber laser sources 103 in the fiber launch array 102. Because the zeroth-order beams 112 impinging on the detector 118 have not been rearranged or reordered relative to each other, the corresponding light points 311 of the diagnostic image 304 are in the same arrangement as the fiber laser sources 103. That is, the first light point 311 shown in the diagnostic image 304 corresponds to the first fiber laser source 103 in the fiber launch array 102, the second light point 311 corresponds to the second fiber laser source 103, and so on.

In FIG. 3E, the diagnostic image 305 shows a misalignment of the third light point 311 as indicated by the arrow 312. This indicates a misalignment of the third fiber laser source 103. The misalignment may include a misalignment in position, a misalignment in pointing angle, or a misalignment in both position and pointing angle. A user reviewing the diagnostic image 305 can quickly understand that the third fiber laser source 103 (and only the third fiber laser source 103) is misaligned. The other fiber laser sources 103 appear to be in correct alignment.

In FIG. 3F, the diagnostic image 306 shows differences in relative illumination among the light points 311, which is indicative of differences in relative illumination among the fiber laser sources 103. Because all of the individual fiber laser sources 103 are shown together in the diagnostic image 306, it is easy to compare the illuminations produced by the fiber laser sources 103 and determine if there is a source failure. Here, it is readily seen that the top and bottom fiber laser sources 103 have different levels of illumination compared to the remaining fiber laser sources 103 as indicated by the arrows 313. This indicates a potential failure or other issue that may require attention. Using the diagnostic image 306, the fiber laser sources 103 do not need to be turned on and off one at a time in order to identify this problem.

As depicted in the diagnostic images 304-306, the system 100 enables monitoring of relative fiber powers between different fiber laser sources, monitoring of individual fiber alignment, monitoring for catastrophic damage to the fibers (as indicated by a significant brightening or darkening in one or more light points 311 such as is shown in FIG. 3F), and estimating combined beam quality in real-time due to changes in nominal alignment of the system 100. By imaging the fiber launch array 102 using zeroth-order light on a single detector 118, the relative illumination from each fiber laser source 103 and individual source alignment can be monitored with reduced equipment. The monitoring can be performed in real-time, which enables real-time, autonomous alignment control in the system 100. Moreover, because relative source illumination and alignment are monitored in real-time, potential system failures can be identified prior to catastrophic damage occurring to the sources or subsequent optics in the system.

Although FIGS. 3A through 3F illustrate examples of benefits that can be realized using one or more of the embodiments of this disclosure, various changes may be made to FIGS. 3A through 3F. For example, the number of light points may vary based on the number of fiber laser sources 103 in the fiber launch array 102, and the arrangement of the light points may vary based on the arrangement of the fiber laser sources 103 in the fiber launch array 102. Also, detector images may convey a broad range of information, and these figures do not limit the scope of this disclosure. These figures are merely meant to illustrate example types of benefits that might be obtainable using the techniques described above.

Figure 4:
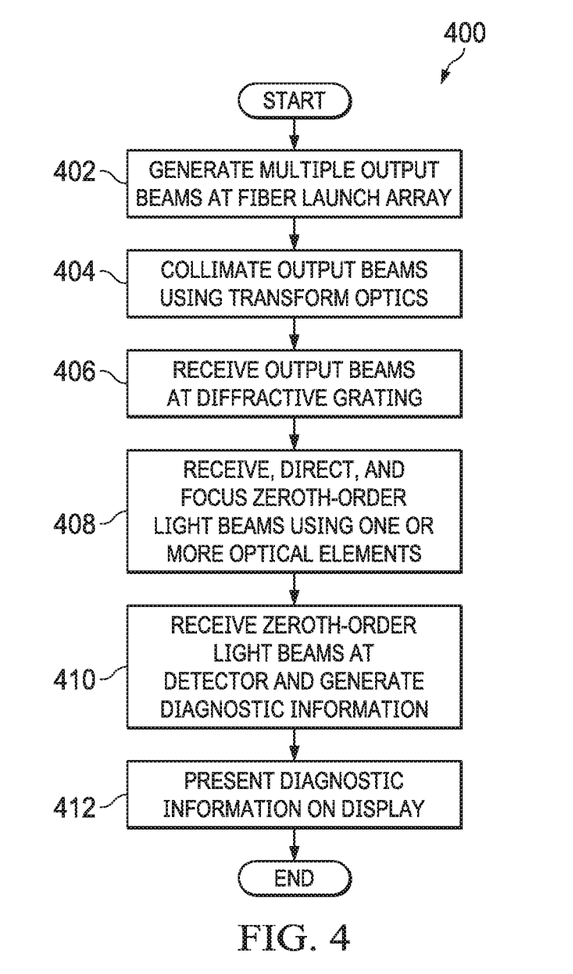
FIG. 4 illustrates an example method for performing diagnostics in an SBC system according to this disclosure

FIG. 4 illustrates an example method 400 for performing diagnostics in an SBC system according to this disclosure. For ease of explanation, the method 400 shown in FIG. 4 is described as being performed using the system 100 shown in FIGS. 1 and 2. However, the method 400 may be used with any other suitable system.

At step 402, multiple output beams are generated at a fiber launch array having multiple laser sources. This may include, for example, the fiber laser sources 103 of the fiber launch array 102 generating multiple output beams 104. At step 404, the output beams are collimated using transform optics. This may include, for example, the transform optics 106 collimating the output beams 104. At step 406, the multiple output beams from the multiple laser sources are received at a diffractive grating. This may include, for example, the diffractive grating 108 receiving the output beams 104.

At step 408, multiple zeroth-order light beams are received, directed, and focused using one or more optical elements. This may include, for example, the fold mirrors 114 and the optical elements 116 receiving, directing, and focusing the zeroth-order beams 112, which are reflected off the diffractive grating 108. Here, the zeroth-order light beams include portions of the output beams reflected off the diffractive grating.

At step 410, the zeroth-order light beams are received at a detector, and the zeroth-order light beams are processed to generate diagnostic information (such as one or more diagnostic image information or other information for presentation on a display). This may include, for example, the detector 118 receiving the zeroth-order beams 112 from the optical elements 116 and processing the zeroth-order beams 112 to generate diagnostic image information for presentation on the display 204 of the computing device 202. In some embodiments, the diagnostic image information includes information for presenting multiple light points (such as the light points 311) on the display in an arrangement that corresponds to the multiple laser sources 103.

The diagnostic information may then be used in any suitable manner. For instance, at step 412, a computing device may present one or more diagnostic images on the display. This may include, for example, the computing device 202 presenting diagnostic images, such as the diagnostic images 304-306, on the display 204. Note, however, that the diagnostic information may be used in any other suitable manner, such as to correct for misalignment or to shut down the system 100 to avoid damage.

Although FIG. 4 illustrates one example of a method 400 for performing diagnostics in an SBC system, various changes may be made to FIG. 4. For example, while shown as a series of steps, various steps shown in FIG. 4 may overlap, occur in parallel, occur in a different order, or occur multiple times. Also, some steps may be combined or removed and additional steps may be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a diffractive grating configured to:
     receive multiple output beams from an array of laser sources;
     produce a combined beam comprising a first portion of the output beams that are diffracted by the diffractive grating at a diffraction angle; and
     produce multiple zeroth-order light beams comprising a second portion of the output beams that are reflected off the diffractive grating without being diffracted by the diffractive grating, wherein the multiple zeroth-order light beams are reflected at reflection angles different than the diffraction angle;
   one or more optical elements configured to receive, direct, and focus the multiple zeroth-order light beams without receiving the combined beam; and
   a detector configured to receive the zeroth-order light beams from at least one of the one or more optical elements and process the zeroth-order light beams to generate diagnostic information.

2. The apparatus of claim 1, wherein the one or more optical elements comprise at least one fold mirror configured to direct the zeroth-order light beams toward the detector.

3. The apparatus of claim 1, wherein each of the zeroth-order light beams corresponds to one of the output beams.

4. The apparatus of claim 1, wherein the diagnostic information comprises information for presenting multiple light points on a display in an arrangement that corresponds to the array of laser sources.

5. The apparatus of claim 1, wherein the diagnostic information is configured to indicate a problem with at least one of the laser sources without a need to turn the laser sources on and off one at a time.

6. The apparatus of claim 5, wherein the problem with the at least one of the laser sources comprises at least one of: a misalignment in position, a misalignment in pointing angle, and a different level of illumination.

7. The apparatus of claim 1, wherein a distance between the one or more optical elements and the detector is less than six inches.

8. A system comprising:
   a fiber launch array comprising multiple laser sources configured to generate multiple output beams;
   a diffractive grating configured to:
     receive the multiple output beams from the multiple laser sources;
     produce a combined beam comprising a first portion of the output beams that are diffracted by the diffractive grating at a diffraction angle; and
     produce multiple zeroth-order light beams comprising a second portion of the output beams that are reflected off the diffractive grating without being diffracted by the diffractive grating, wherein the multiple zeroth-order light beams are reflected at reflection angles different than the diffraction angle;
   one or more optical elements configured to receive, direct, and focus the multiple zeroth-order light beams without receiving the combined beam; and
   a detector configured to receive the zeroth-order light beams from at least one of the one or more optical elements and process the zeroth-order light beams to generate diagnostic information.

9. The system of claim 8, wherein the one or more optical elements comprise at least one fold mirror configured to direct the zeroth-order light beams toward the detector.

10. The system of claim 8, wherein each of the zeroth-order light beams corresponds to one of the output beams.

11. The system of claim 8, wherein the diagnostic information comprises information for presenting multiple light points on a display in an arrangement that corresponds to the multiple laser sources.

12. The system of claim 8, wherein the diagnostic information is configured to indicate a problem with at least one of the laser sources without a need to turn the laser sources on and off one at a time.

13. The system of claim 12, wherein the problem with the at least one of the laser sources comprises at least one of: a misalignment in position, a misalignment in pointing angle, and a different level of illumination.

14. The system of claim 8, wherein a distance between the one or more optical elements and the detector is less than six inches.

15. The system of claim 8, further comprising:
   transform optics configured to collimate the output beams before the output beams are received at the diffractive grating.

16. A method comprising:
   generating multiple output beams at a fiber launch array comprising multiple laser sources;
   receiving the multiple output beams from the multiple laser sources at a diffractive grating;
   diffracting a first portion of the output beams by the diffractive grating to produce a combined beam at a diffraction angle;
   reflecting, without diffracting, a second portion of the output beams by the diffractive grating to produce multiple zeroth-order light beams, wherein the multiple zeroth-order light beams are reflected at reflection angles different than the diffraction angle;
   receiving, directing, and focusing the multiple zeroth-order light beams using one or more optical elements without receiving the combined beam;
   receiving the zeroth-order light beams from at least one of the one or more optical elements at a detector; and
   processing the zeroth-order light beams to generate diagnostic information.

17. The method of claim 16, further comprising:
   collimating the output beams using transform optics before the output beams are received at the diffractive grating.

18. The method of claim 16, wherein the diagnostic information comprises information for presenting multiple light points on a display in an arrangement that corresponds to the multiple laser sources.

19. The method of claim 16, wherein the diagnostic information indicates a problem with at least one of the laser sources without a need to turn the laser sources on and off one at a time.

20. The method of claim 19, wherein the problem with the at least one of the laser sources comprises at least one of: a misalignment in position, a misalignment in pointing angle, and a different level of illumination.

* * * * *